Jan. 23, 1962   R. M. GINDER   3,017,868
OIL MOTOR
Filed March 1, 1960
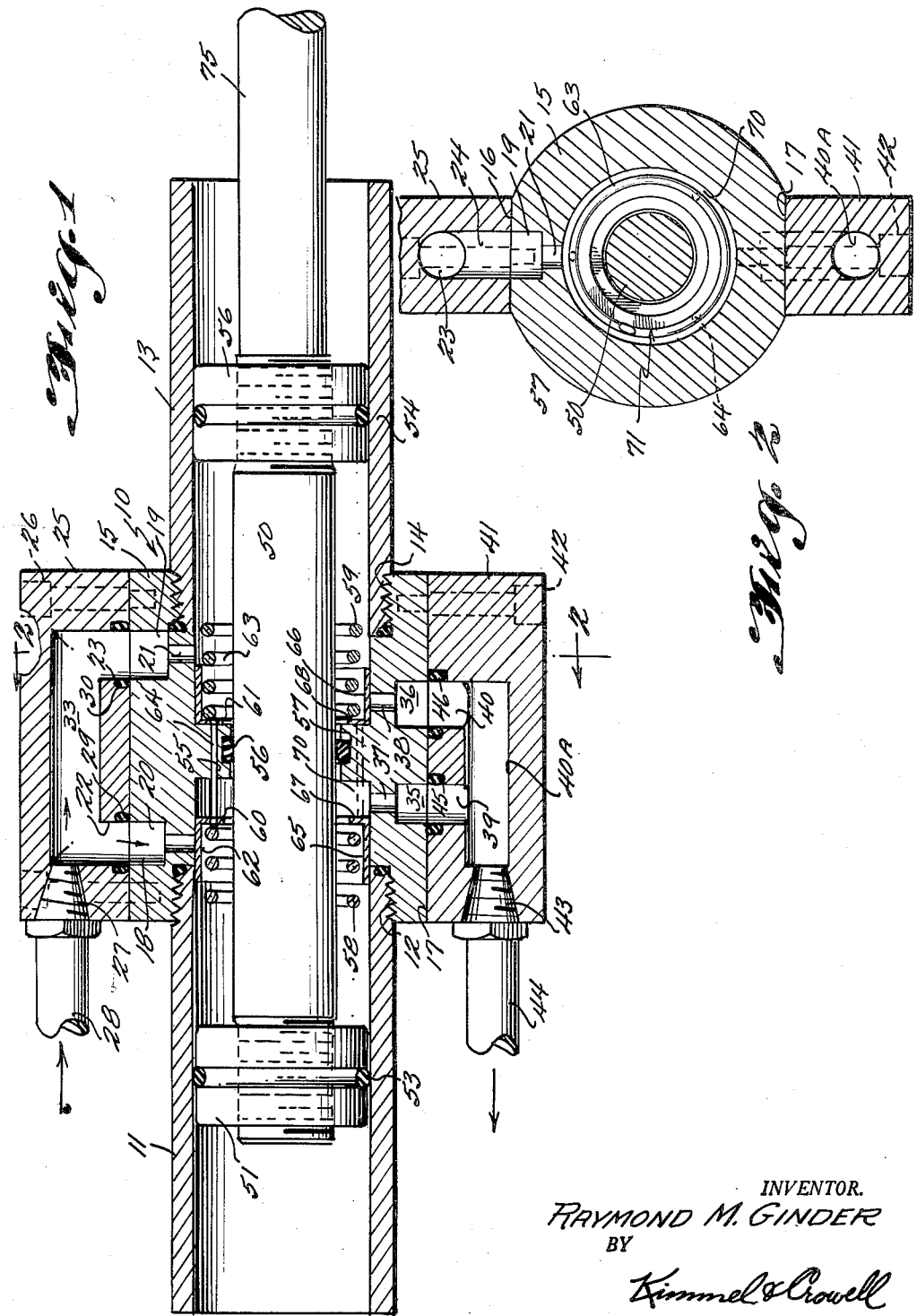
INVENTOR.
RAYMOND M. GINDER
BY
Kimmel & Crowell
ATTORNEYS

United States Patent Office 3,017,868
Patented Jan. 23, 1962

3,017,868
OIL MOTOR
Raymond M. Ginder, 1218 N. 9th St., Salina, Kans.
Filed Mar. 1, 1960, Ser. No. 12,204
4 Claims. (Cl. 121—164)

This invention relates to an oil motor, and has as its primary object the provision of a motor driven by oil or similar fluid for applying reciprocatory movement to a drive shaft, such, as for example, is employed in a mowing machine, a sickle, a jack hammer, a cross-cut saw, or the like.

An additional object of the invention is the provision of a simplified oil motor of this character wherein oil flowing continuously through a series of valves reciprocates a shaft provided with a double piston continuously, in such manner as to impart a reciprocatory movement to the apparatus driven by the shaft.

An additional object of the invention is the provision of a device of this character which is sturdy and durable in construction, reliable and efficient in operation, and relatively simple and inexpensive to manufacture, assemble and utilize.

Other objects will in part be obvious and in part be pointed out as the description of the invention proceeds, and shown in the accompanying drawing, wherein:

FIGURE 1 is a longitudinal transverse sectional view taken through one form of pump or motor embodying the elements of the instant invention; and FIGURE 2 is a sectional view taken substantially along the line 2—2 of FIGURE 1 as viewed in the direction indicated by the arrows.

Having reference now to the drawing in detail, the oil motor of the instant invention generally indicated at 10 consists of a tubular section 11, which is threaded as at 12, aligned with a second tubular section 13 externally threaded as at 14. The sections are connected by means of an internally threaded sleeve 15, which is provided with a flat upper portion 16 and a flattened opposed or lower portion 17. The sleeve is provided with a pair of, illustratively, upper ports 18 and 19, which are provided with reduced end portions 20 and 21, respectively. The ports 18 and 19 communicate with the opposite ends 22 and 23 of a U-shaped tube 24 positioned interiorly of a block 25 which is secured in any desired manner as bolts 26 to the upper smooth surface 16 of the sleeve. An oil inlet nozzle 27 extends through one side of the block 25 into communication with the port or passage 24, and is supplied with oil through a pipe 28, which extends from any suitable oil reservoir or source of oil supply.

Suitable ring seals 29 and 30 seal the junctures of passages 18 and 22 and 19 and 23, respectively.

The opposite flattened portion 17 of sleeve 15 has a pair of ports 35 and 36 therein, which communicate with reduced ports 37 and 38, which in turn communicate with the interior of the passage formed by the sections 11 and 13. Ports 35 and 36 in turn communicate with ports 39 and 40 which are located in a lower block 41, which is secured as by means of screws or bolts 42 to the lower smooth surface 17 of sleeve 15. An oil exit 43 extends from passage 40a and communicates with an oil line 44, which returns to the reservoir or source of supply.

Oil rings 45 and 46 seal the juncture of ports 35 and 39 and 36 and 40, respectively.

Interiorly of the tubular member 11—13 is a piston rod 50, which is provided with oppositely disposed pistons 51 and 52 which carry sealing rings 53 and 54 and which are disposed on opposite sides of a central interior annulus 55 which forms a part of ring 15, and extends into the interior of the passage between the ends of tubular sections 11 and 13. A sealing ring 54 positioned in a suitable groove 57 engages the periphery of piston rod 50, and forms an oil seal therebetween.

Cushioning springs 58 and 59, respectively, are seated on opposite sides of central partition 55, and have their inner ends engaging inturned flanges 60 and 61 of opposed upper slide valve members 62 and 63. The extending ends 60 and 61 are connected by means of a connecting rod 64, so that the slide valves 62 and 63 move in unison. Lower slide valves 65 and 66 are also provided adjacent the ports 37 and 38, and include upturned end portions 67 and 68, respectively, which are adapted to be engaged by the inner ends of springs 58 and 59. Ends 67 and 68 are similarly connected by a connecting pin 70 similar to the connecting pin 64.

The valves 62, 63, 65 and 66 have all been described as individual valves in order to effectively describe their relationship to the various ports. In actuality, they are all parts of a common cup-shaped member generally indicated at 71, as shown, in FIGURE 2, the cup comprising a pair of opposed portions, connected by the rods 55 and 70.

It will be noted that the valve ports 20 and 21 are positioned farther apart than the ports 37 and 38, and the arrangement is such that when the piston 51, for example, engages the spring 58 to move the valve 62 to open position, that the valve port 37 is closed by the slide valve 65. The arrangement is thus such that oil entering through the port 20 serves to move the piston 51 outwardly or away from the central partition 55. Simultaneously in this position the port 21 is closed, and the exit port 38 is opened so that on the return stroke the piston 52 forces oil outwardly through the port 38 and through the return line 44. When the piston 52 is moved into a position to engage the slide valves 63 and 66 to move them respectively to open and closed position, opening the port 21 and closing the port 38, the port 20 will be closed, as shown in the drawing, and the port 37 will be open, whereupon oil flowing through the port 21 will again force the piston 52 outwardly, moving the piston 51 inwardly, while oil retained in the space between the ring 55 and the piston 51 is exited through the port 37.

Thus the reciprocation will be continued as long as oil is supplied to the device, and a safe, satisfactory and effective reciprocatory movement will be imparted to the drive rod 75, from which the rciprocatory motion may be transmitted to any desired device.

From the foregoing it will now be seen that there is herein provided an improved oil motor, which accomplishes all of the objects of this invention, and others, including many advantages of great practical utility and commercial importance.

As many embodiments may be made of this inventive concept, and as many modifications may be made in the embodiment hereinbefore shown and described, and it is to be understood that all matter herein is to be interpreted merely as illustrative and not in a limiting sense.

I claim:

1. An oil motor including a tube, a piston rod in said tube, a central partition in said tube sealingly engaging said piston rod, a pair of pistons on said piston rod, one on each side of said partition, a pair of inlet ports on one side of said tube, one on each side of said partition, a pair of diametrically opposed outlet ports on the other side of said tube, one on each side of said partition, a valve member for simultaneously closing the inlet port and opening the outlet port on one side of said partition, a second valve member for simultaneously opening the inlet valve port and closing the outlet port on the other side of said partition, means connecting said valve members, said ports being so arranged that the closure of one inlet port opens the other, and closure of one outlet port opens the other, and vice versa, said valve members being positioned in the path of travel of said pistons, whereby movement of one piston to a position engaging one valve member opens the inlet port and closes the outlet port on that side of said partition and simultaneously closes the inlet port and opens the outlet port on the other side of the partition, reversing the direction of travel of said piston, spring means interposed between said pistons and said valve members, said first and second valve members comprising cup-shaped portions having apertured bases with the piston rod extending through the apertures in said bases, and upstanding flanges, said springs engaging said flanges when engaged by said pistons to move said valve members, an oil supply source, means for continuously supplying oil to said inlet ports, and means returning oil from said outlet ports to said supply source.

2. An oil motor including a tube, a piston rod in said tube, a central partition in said tube sealingly engaging said piston rod, a pair of pistons on said piston rod, one on each side of said partition, a pair of inlet ports on one side of said tube, one on each side of said partition, a pair of diametrically opposed outlet ports on the other side of said tube, one on each side of said partition, a valve member for simultaneously closing the inlet port and opening the outlet port on one side of said partition, a second valve member for simultaneously opening the inlet valve port and closing the outlet port on the other side of said partition, means connecting said valve members, said ports being so arranged that the closure of one inlet port opens the other, and closure of one outlet port opens the other, and vice versa, said valve members being positioned in the path of travel of said pistons, whereby movement of one piston to a position engaging one valve member opens the inlet port and closes the outlet port on that side of said partition and simultaneously closes the inlet port and opens the outlet port on the other side of the partition, reversing the direction of travel of said piston, coil springs interposed between said pistons and said valve members, said first and second valve members comprising cup-shaped portions having apertured bases with the piston rod extending through the apertures in said bases, and upstanding flanges, said springs engaging said flanges when engaged by said pistons to move said valve members.

3. An oil motor having a body portion including a pair of tubular members, a reciprocable piston rod in said body portion, a valve body coupling said tubular members in axial alignment, said valve body including a substantially centrally disposed inwardly projecting web sealingly engaging said piston rod, said valve body further including axially extending cylindrical walls having portions defining first and second pairs of openings therein in communication with the interior of said tubular members, said first pair of openings disposed on one side of said inwardly extending web and said second pair of openings disposed on the other side of said web, one each of said pairs of openings being fluid inlets, the other of said pairs of openings being fluid outlets, a pair of substantially cup-shaped valves disposed on opposite sides of said inwardly extending web and in engagement with the inner surface of the axially extending cylindrical walls of said valve body, means interconnecting said valves, said valves including inwardly projecting flange portions defining an opening through which said piston rod may pass, spring means engaging said flanges on each of said valves, pistons on each end of said piston rod adapted to engage said spring means when said piston rod is reciprocated whereby each of said valves is moved simultaneously to allow a flow of fluid through the inlet opening on one side of said inwardly projecting web and a flow of fluid through the outlet opening on the other side of said web respectively and manifold means secured to said valve body in overlying relation to each of said pairs of openings in said valve body.

4. An oil motor including a pair of aligned cylinders each having an inlet port in its side wall and a diametrically positioned outlet port in its side wall adjacent the opposed end, a central partition having an axial hole therethrough between said cylinders at their opposed ends, pistons slidably mounted in the respective cylinders, a piston rod connected to said pistons and slidably received in the axial hole in the central partition in close fitting engagement with the latter, cylindrical valve members having inwardly extending flanges slidably mounted in the respective cylinders and surrounding said piston rod, means interconnecting the valve members for converse operation, coiled springs surrounding said piston rod between the respective pistons and the cylindrical valve members, whereby movement of one piston toward the central partition exerts force through the coiled spring on the cylindrical valve member to open the inlet port and close the exhaust port of the respective cylinder and conversely movement of the other piston toward the central partition exerts force through the coiled spring on the cylindrical valve member to open the inlet port and close the exhaust port of the respective cylinder for reversing the direction of travel of the pistons, an oil supply source, means for continuously supplying oil under pressure from the oil supply source to the inlet ports in the cylinders, and means returning oil from the outlet ports in the cylinders to said supply source.

References Cited in the file of this patent

UNITED STATES PATENTS

| | | |
|---|---|---|
| 840,886 | Wilkins | Jan. 8, 1907 |
| 1,441,017 | Mattson et al. | Jan. 2, 1923 |
| 2,555,018 | Von Seggern | May 29, 1951 |
| 2,618,242 | Hutchins | Nov. 18, 1952 |
| 2,699,153 | Russell | Jan. 11, 1955 |